United States Patent Office 3,516,950
Patented June 23, 1970

3,516,950
FOAMED POLYMERS
Geoffrey Arthur Haggis, Manchester, England, assignor to Imperial Chemical Industries Limited, Millbank, London, England, a corporation of Great Britain
No Drawing. Continuation of application Ser. No. 543,820, Apr. 20, 1966. This application Feb. 25, 1969, Ser. No. 804,363
Claims priority, application Great Britain, Apr. 15, 1966, 18,116/65
Int. Cl. C08g 22/46
U.S. Cl. 260—2.5     15 Claims

ABSTRACT OF THE DISCLOSURE

A process for the manufacture of rigid polymeric foams characterized by the presence therein of an isocyanurate ring structure, said process comprising forming a reaction mixture containing a simple organic polyisocyanate, a catalyst for the polymerization of isocyanates, a blowing agent and, optionally, an amount of a hydroxy compound having a molecular weight not exceeding 300 sufficient, together with any other active hydrogen containing materials present in the reaction mixture, to react with not more than 60% of the isocyanate groups initially present in the polyisocyanate.

This is a continuation of our application Ser. No. 543,820 filed Apr. 20, 1966, now abandoned.

This invention relates to the production of foamed polymers and more particularly foamed polymers which are characterised by the presence therein of an isocyanurate ring structure.

It is already known to manufacture foamed polymers which are characterised by the presence therein of a plurality of urethane groups and which are usually described as polyurethane foams. Such foams are conventionally made by reacting an organic polyisocyanate with a polymeric polyol in the presence of a gas-generating agent. It is also known to polymerise organic polyisocyanates forming polymeric polyisocyanates containing an isocyanurate ring structure and to use the products together with monomeric polyisocyanates in the preparation of polyurethane foams.

The present invention provides a process for the manufacture of rigid polymeric foams characterised by the presence therein of an isocyanurate ring structure, said process comprising forming a reaction mixture containing a simple organic polyisocyanate, as hereinafter defined, a catalyst for the polymerisation of isocyanates, a blowing agent and, optionally, an amount of a hydroxy compound having a molecular weight not exceeding 300 sufficient, together with any other active hydrogen containing materials present in the reaction mixture, to react with not more than 60% of the isocyanate groups initially present in the polyisocyanate.

The simple organic polyisocyanates which may be used in the process of the present invention include monomeric organic polyisocyanates which, optionally, may be associated with polyisocyanates of a polymeric nature which may be formed during the manufacture of said monomeric polyisocyanates and which are often present in the crude products. Thus, for example, diarylmethane diisocyanates may be associated with varying proportions of polymethylene polyphenylpolyisocyanates. Other polyisocyanates which may be used include the simple reaction products obtained by reacting an excess of a monomeric polyisocyanate with a monomeric polyol or mixture of polyols. More complex isocyanato bodies such as the so-called prepolymers obtained by reacting monomeric polyisocyanates with polyester or polyether polyols are not regarded as simple organic polyisocyanates for the purpose of the present invention.

Examples of suitable organic polyisocyanates for use in the process of the present invention include tolylene-2,4-diisocyanate, tolylene-2,6-diisocyanate, diphenylmethane-4,4'-diisocyanate, 3-methyldiphenylmethane-4,4' - diisocyanate, 1,1-bis(4-isocyanatophenyl)cyclohexane, m-, and p-phenylene diisocyanates, chlorophenylene-2,4- diisocyanate, naphthalene -1,5-diisocyanate, diphenyl-4,4'-diisocyanate, 3,5'-dimethyldiphenyl-4,4'-diisocyanate, and diphenylether-4,4'-diisocyanate. Triisocyanates which may be used include diphenylether-2,4,4'-triisocyanate. The polyisocyanates may be used in either a crude or purified form. Examples of other suitable organic polyisocyanates comprise the reaction products of an excess of a diisocyanate with a polyhydric alcohol such as trimethylolpropane. Mixtures of polyisocyanates may be used. Examples of especially suitable polyisocyanates include the crude diisocyanato-diarylmethane compositions obtained by the phosgenation of crude diaminodiarylmethanes which in turn are prepared by the reaction of aromatic amines, for example aniline and toluidines or mixtures of such amines, with formaldehyde. The reaction products of aromatic amines with formaldehyde contain diaminodiarylmethanes and also polyphenyl polyamines of functionality greater than two. These include particularly triamines but also higher molecular weight polyamines. The ratios in which the various polyamines are present in the crude product depend to a very large extent upon the initial ratio of aromatic amine to formaldehyde. In order to produce a crude diaminodiarylmethane suitable for use in the production of a polyisocyanate for use in the present invention it is preferred that the molar ratio of aromatic amine to formaldehyde is between 4:1 and 1.2:1 and preferably between 2.5:1 and 1.5:1. There may also be used crude polyisocyanates of this type from which a portion of difunctional material has been removed either as diamine before phosgenation or as diisocyanate afterwards.

In the phosgenation of the crude diaminodiarylmethane, the diamines, triamines and higher polyamines are converted into the corresponding diisocyanates, triisocyanates and polyisocyanates. Whilst the proportions of the various constituents of the crude diisocyanate composition are largely influenced by the proportions of the various amines present in the crude diamine, it is also possible for side reactions to take place during the phosgenation process resulting in increased proportions of high functionality and high molecular weight ingredients. For use in the process of the present invention the crude diisocyanate compositions suitably have viscosities in the range of from 50 to 5000 centipoises and preferably from 200 to 1000 centipoises at 25° C.

The crude diisocyanatodiarylmethane compositions used in the process of the present invention have obvious economic advantages over pure diisocyanates. In addition it has been found in many cases to be technically advantageous to use the crude compositions compared with pure diisocyanates such as distilled diisocyanato diphenylmethane. In particular, the foam-forming step causes less difficulty when the crude compositions are employed, there being less tendency for gas to be lost from the reaction mixture with the resulting formation of dense or irregular products. Whilst these advantages are obtained to a considerable extent by using crude diisocyanatodiarylmethane compositions containing from 5 to 70% by weight of polyisocyanates of functionality greater than two, it is particularly advantageous to use compositions containing from 20 to 60% of such polyisocyanates.

It is sometimes advantageous to use organic polyisocyanates which do not have an excessively high hydrolysable chlorine content. In order to reduce the hydrolysable chlorine contents of crude polyisocyanates they may be treated with lime or other weakly basic materials, or alternatively they may be heated at temperatures between 150 and 220° C. while passing a stream of inert gas through the liquid to assist in the removal of hydrogen chloride. Such treatment not only reduces the hydrolysable chlorine content, and hence the amount of catalyst which must be used in the subsequent foaming stage, but also results in some polymerisation of the isocyanate, giving rise to a higher viscosity product. Such products are sometimes advantageous in giving foam mixes less liable to collapse.

Catalysts which promote the polymerisation of isocyanates forming products containing an isocyanurate ring structure have been widely described in the prior art including, for example, British patent spectifications Nos. 809,809, 837,120 and 856,372.

Suitable catalysts include strong bases such as quaternary ammonium hydroxides, for example benzyl trimethylammonium hydroxide, alkali metal hydroxides, for example potassium hydroxide and alkali metal alkoxides, for example sodium methoxide. Other suitable catalysts include materials of a more weakly basic nature such as alkali metal salts of carboxylic acids, for example sodium acetate, potassium acetate, potassium 2-ethylhexoate, potassium adipate and sodium benzoate, certain tertiary amines, for example N-alkylethyleneimines and tris-3-dimethylaminopropyl hexahydro-s-triazine and potassium phthalimide. Other suitable catalysts include non-basic metal salts of carboxylic acids, for example lead octate. In many cases it is advantageous to use in conjunction with the aforesaid catalysts, materials which are not, in themselves, capable of polymerising isocyanates to any substantial extent. Such materials include the majority of aliphatic tertiary amines, for example 1,4-dizabicyclo-[2.2.2]octane and N,N - dimethylbenzylamine, certain organic metal compounds, for example stannous octoate and dibutyltin dilaurate and epoxides, for example propylene oxide, phenyl glycidyl ether and the diglycidyl ether of 2,2-bis-4-hydroxyphenylpropane. Some tertiary amines, for example 1,4-diazabicyclo[2.2.2]octane and N,N - dimethylcyclohexylamine will behave as catalysts for the polymerisation of isocyanates in the presence of epoxides. Many of these materials, for example tertiary amines and tin compounds are, of course, well known as catalysts for the reaction between isocyanates and hydroxy compounds.

The most suitable amount of catalyst to use depends to a very large extent upon the effectiveness of the particular catalyst in question. In general it is found suitable to use from 0.1 to 5 and more usually from 0.5 to 5 and preferably from 0.5 to 3 parts by weight of catalyst for each 100 parts by weight of organic polyisocyanate.

Blowing agents which may be used in the process of the present invention include water which reacts with isocyanate groups forming carbon dioxide. Amounts of water which may suitably be used are from 0.1 to 2% based on the weight of polyisocyanate. Larger amounts of water may be used if desired but preferably not where thermal stability or thermal insulation properties are of particular importance. Since water is an active hydrogen-containing compound, the amount used must be taken into consideration when considering the amount of polyisocyanate to be used.

Other blowing agents which may be used include inert low boiling-point liquids which vaporise under the influence of the exothermic polymerisation reaction.

Suitable low boiling-point liquids are liquids that are inert towards the organic polyisocyanate and have boiling points not exceding 100° C. at atmospheric pressure and preferably between −40° C. and 50° C. Examples of such liquids are halogenated hydrocarbons such as methylene chloride, ethylene chloride, vinylidene chloride, trichloromonofluoromethane, dichlorodifluoromethane, dichloromonofluoromethane, monochlorodifluoromethane, dichlorotetrafluoroethane, 1,1,2 - trichloro-1,2,2-trifluoroethane, dibromofluoromethane and monobromotrifluoroethane. Mixtures of these low boiling-point liquids one with another and/or with other substituted or unsubstituted hydrocarbons may also be used.

The most suitable amount of low boiling-point liquid to use depends upon the foam density it is desired to achieve and also on the presence or absence of water as a blowing agent. In general, amounts of from 5 to 40 parts by weight for each 100 parts by weight of organic polyisocyanate are found to produce the most satisfactory results.

There may also optionally be included in the reaction mixture a hydroxy compound having a molecular weight not exceeding 300. This may be a monohydric alcohol, for example ethanol or n-butanol or a monohydric phenol, for example phenol, cresols or xylenols but preferably it is a polyhydroxy compound, for example ethylene glycol, diethylene glycol, 1,4-butanediol, glycerol, trimethylolpropane, triethanolamine or resorcinol and the reaction products, having molecular weights not exceeding 300, of such polyhydroxy compounds with alkylene oxides such as ethylene oxide or propylene oxide. The amount of hydroxy compound, where used, should be sufficient, together with any other active hydrogen containing materials present in the reaction mixture, particularly water, to react with not more than 60% of the isocyanate groups present in the polyisocyanate at the start of the reaction. Usually, up to 20 parts by weight of hydroxy compound may be used for each 100 parts by weight of polyisocyanate. In general, increasing the amount of hydroxy compound used facilitates the foaming process but tends to reduce the rigidity and thermal stability of the foamed product. The most suitable amount to be used in any particular case may easily be found by trial. While foams can be made without using a hydroxy compound at all, in general it is preferred to use an amount of hydroxy compound sufficient, together with any other active hydrogen containing materials present in the reaction mixture, to react with from 10% to 40% of the isocyanate groups initially present in the polyisocyanate. Where a hydroxy compound is used, it is advantageous in order to produce foams having maximum rigidity and thermal stability that the molecular weight of the hydroxy compound should not exceed 250.

Thus the reaction mixture may contain surface active agents which may serve to assist homogenisation of the ingredients and, in some cases, to regulate the cell structure of the foamed product. Suitable agents include siloxane-oxyalkylene copolymers and other organopolysiloxane fluids, oxyethylated alkylphenols, oxyethylated fatty alcohols and block copolymers of ethylene and propylene oxides.

It may also be advantageous to include a plasticiser in the foam-forming reaction mixture so as to reduce any tendency towards friability in the products. Conventional plasticising agents may be employed but it is particularly convenient to use those agents which contain phosphorus and/or halogen atoms and which thereby increase the flame resistance of the foamed products. Such agents include tricresyl phosphate, tris-2-chloroethyl phosphate, tris-chloropropyl phosphate and tris-2,3-dibromopropyl phosphate.

Fillers may also be incorporated in the foam-forming reaction mixture; suitable ones include barium sulphate, chalk, asbestos, silica, calcium silicate, alumina, polyvinyl chloride, polyvinylidene chloride and fibrous materials such as nylon and polyethylene terephthalate fibres.

Other useful additives include antioxidants, for example, polyhydric phenols, substituted monohydric phenols, polyphenols, sulphides, dithiocarbamates, dialkyldithiophosphates, phosphites, thiophosphites, aromatic amines and tetraalkyl thiuram disulphides.

It is also sometimes advantageous to include a high molecular weight thermoplastic film-forming polymer in the foam-forming reaction mixture in order to assist in the retention of the gas produced by the vaporisation of the low boiling-point liquid. Ethyl cellulose is particularly effective but other polymers which may be used include other cellulose ethers, for example, methyl cellulose, benzyl cellulose, methyl hydroxypropyl cellulose and ethyl hydroxyethyl cellulose, cellulose esters, for example, cellulose acetate/butyrate, polyvinyl chloride, partially hydrolysed polyvinyl acetate, vinyl chloride/vinyl acetate copolymers, polystyrene and acrylate and methacrylate polymers and copolymers. The high molecular weight thermoplastic film-forming polymer may be incorporated in the reaction mixture in the form of a dispersion or solution in the organic polyisocyanate or other suitable liquid medium. Whilst up to 10 parts by weight of film-forming polymer for each 100 parts by weight of organic polyisocyanate may be used it is preferred to use from 1 to 5 parts.

In carrying out the process of the present invention the reaction mixture ingredients may be mixed together in any convenient manner that will ensure rapid and uniform blending of the materials. Thus, the ingredients may be mixed in batchwise or continuous manner using conventional dispensing or spraying apparatus. The various components may be delivered separately to the mixing device or, alternatively, previously prepared mixtures of mutually inert ingredients may be used so as to reduce the number of component streams requiring to be mixed in the final stage. It is particularly convenient to use a two-stream system in which one stream comprises the polyol having a molecular weight not exceeding 300 and the polymerisation catalyst whilst the other stream comprises the organic polyisocyanate. When water is used as blowing agent it is included with the polyol; inert volatile blowing agents may be included with either the polyol or the polyisocyanate. Other agents which may be used, for example surface active agents and flame-proofing agents, may be incorporated in the polyol mixture or in the polyisocyanate if unreactive therewith. It is particularly advantageous when using two-stream mixes to employ as polymerisation catalyst a basic metal compound of the type already described, either alone or in admixture with a tertiary amine. Thus, mixtures of a polyol with potassium acetate and a tertiary amine and other optional additives have sufficient stability to be stored for 48 hours or more before being mixed with the polyisocyanate in the foam-forming step.

It is advantageous in some cases in order to produce foams having the most desirable properties, that foam formation should take place in heated moulds and that the foams should be given an aftercure at an elevated temperature, for example 1–2 hours at a temperature of about 100° C.

If the mixture of volatile blowing agents has a boiling point below room temperature it may be convenient to prepare the blend of ingredients under pressure. On discharge from the mixing chamber expansion is partially achieved by volatilisation of the blowing agents followed by further expansion in a mould as the mix subsequently cures.

The rigid polymeric foams produced by the process of the present invention have excellent high temperature properties and so are particularly suitable for use in situations where this property can be fully exploited. In particular the foams are characterised by outstanding resistance to deformation at high temperatures, for example temperatures in the range of from 100 to 250° C. and also by greatly increased resistance to combustion even when no flame-proofing additive is incorporated. In fact, many foams prepared by the process of the present invention can be rated as Class 1 in the "Surface Spread of Flame" test specified in British Standard 476; part 1:1953 (Fire Tests on Building Materials and Structures). A good polyurethane rigid foam is usually rated as Class 4 in this test.

The products of the present invention are particularly suitable for use as insulating materials and as building and structural components, particularly where exposure to high temperatures and/or fire is likely. For structural applications, the foams may be used in the form of laminates with other materials such as hardboard, asbestos, plaster board or paper.

The invention is illustrated but not limited by the following examples in which all parts are by weight.

EXAMPLE 1

30 parts of distilled diphenylmethane-4,4'-diisocyanate are mixed with 7 parts of ethylene dichloride, 0.2 part of a siloxane-oxyalkylene copolymer and 0.5 part of tris (3-dimethylaminopropyl)hexahydro-s-triazine. The mixture reacts to form a hard coarse foam of low combustibility.

EXAMPLE 2

30 parts of distilled diphenylmethane-4,4'-diisocyanate are mixed with 8.6 parts of a 10% solution of ethyl cellulose in methylene chloride, 0.3 part of a siloxane-oxyalkylene copolymer, 0.5 part of the diglycidyl ether of 2,2-bis(4-hydroxyphenyl)propane and 0.5 part of tris(3-dimethylaminopropyl)hexahydro-s-triazine. The mixture reacts to form a rather coarse rigid foam of low density.

EXAMPLE 3

30 parts of a crude diphenylmethane diisocyanate composition, which have previously been treated with lime to reduce the hydrolysable chlorine content to below 0.2%, are mixed with 4 parts of ethylene dichloride, 2 parts of n-butanol, 0.3 part of a siloxane-oxyalkylene copolymer, 0.5 part of the diglycidyl ether of 2,2-bis(4-hydroxyphenyl)propane and 0.5 part of tris(3-dimethylaminopropyl)hexahydro-s-triazine. The mixture reacts to form a hard, fine-pored foam having a density of approximately 10 lbs./cu. ft. The foam does not soften or distort when heated at 200° C. for 1 hour and is difficult to burn.

EXAMPLE 4

The procedure of Example 3 is repeated but replacing the 4 parts of ethylene dichloride by 6 parts of trichlorofluoromethane and increasing the amount of n-butanol to 4 parts. The foam obtained is fine-pored and has a density of about 2.5 lbs./cu. ft. The foam does not distort or soften at 200° C.

EXAMPLE 5

Example 4 is repeated using a crude diisocyanato diphenylmethane, which has been heated at 180–190° C. in a stream of nitrogen for 20 hours. The isocyanate content is thereby reduced from 86.4 to 80.0% of theory for diisocyanato diphenylmethane, and the hydrolysable chlorine from 0.4 to 0.17%. The foam product is similar to that of Example 4.

EXAMPLE 6

Example 5 is repeated, replacing the n-butanol by 1 part of ethanol. The foam obtained is fine-pored, but rather friable.

EXAMPLE 7

Example 5 is repeated, replacing the n-butanol by 2 parts of phenol. A very fine-pored, rather friable foam is obtained.

EXAMPLE 8

A foam is prepared from 30 parts of heat-treated crude diisocyanato diphenylmethane, 6 parts of trichlorofluoromethane, 2 parts of butane-1,4-diol, 0.3 part of a siloxane-oxyalkylene copolymer, 0.5 part of tris(3-dimethylaminopropyl)hexahydro-s-triazine, and 0.5 part of the diglycidyl ether of 2,2-bis(4-hydroxyphenyl)propane. The foam is fine-pored and only slightly friable and is only slightly distorted when heated for 2 hours at 250° C.

EXAMPLE 9

A foam is prepared from 30 parts of a heat-treated crude diphenylmethane diisocyanate having an isocyanate content of 82.8% of theory for diisocyanatodiphenylmethane and a hydrolysable chlorine content of 0.19%, 6 parts of trichlorofluoromethane, 2 parts of 1,2,6-hexanetriol, 0.3 part of a siloxane-oxyalkylene copolymer, 0.3 part of the diglycidyl ether of 2,2-bis(4-hydroxyphenyl)propane and 0.5 part of tris(3-dimethylaminopropyl)hexahydro-s-triazine. The foam is fine-pored and rigid.

EXAMPLE 10

A foam is prepared from 100 parts of the isocyanate used in Example 9, 20 parts of trichlorofluoromethane, 1 part of a siloxane-oxyalkylene copolymer, 10 parts of butane-1,4-diol, 1 part of the diglycidyl ether of 2,2-bis(4-hydroxyphenyl)propane, 1 part of N,N-dimethylcyclohexylamine and 0.5 part of lead octoate. The foam is fine-pored and has a density of 1.8 lbs./cu. ft.

EXAMPLE 11

A series of foams is prepared using the following recipe, with addition of the amounts of metal compound indicated below: 30 parts of heat-treated crude diphenylmethane diisocyanate, 6 parts of trichlorofluoromethane, 0.3 part of siloxane-oxyalkylene copolymer, 2 parts of butane-1,4-diol, 0.5 part of dimethylcyclohexylamine and 1 part of the diglycidyl ether of 2,2-bis(4-hydroxyphenyl)propane.

Added metal compounds (a) 2 parts of nickel octoate
(b) 4 parts of a solution of calcium naphthenate in white spirit, containing 4% calcium
(c) 2 parts of zinc octylate
(d) 2 parts of zirconium iso-octylate
(e) 2 parts of aluminium iso-octylate
(f) 2 parts of the mercury salt of a mixture of $C_{12}$–$C_{18}$ fatty acids.

EXAMPLE 12

A foam is made as in Example 11 but using instead of the metal compound 1 part of a 40% aqueous solution of benzyl trimethylammonium hydroxide. The foam is of good structure and low density.

EXAMPLE 13

A foam is made from 30 parts of heat-treated crude diphenylmethane diisocyanate, 6 parts of trichlorofluoromethane, 0.3 part of a siloxane-oxyalkylene copolymer, 0.5 part of dimethylcyclohexylamine, and a solution of 1 part of sodium hexylene glycol borate in 2 parts of butane-1,4-diol. The foam is fine-pored and cures rapidly.

EXAMPLE 14

A foam is made from 30 parts of an 80:20 mixture of 2,4- and 2,6-tolylene diisocyanates, 0.3 part of a siloxane-oxyalkylene copolymer, 2 parts of butane-1,4-diol, 6 parts of trichlorofluoromethane, 0.2 part of dimethylcyclohexylamine and 0.5 part of lead octoate. The foam produced is coarse and of high density.

EXAMPLE 15

30 parts of a reaction product of an 80:20 mixture of tolylene 2,4- and 2,6-diisocyanates with trimethylolpropane and diethylene glycol, having an isocyanate content of 36.7%, are mixed with 2 parts of butane-1,4-diol, 0.3 part of a siloxane-oxyalkylene copolymer, 1 part of the diglycidyl ether of 2,2-bis(4-hydroxyphenyl)propane, 6 parts of trichlorofluoromethane, 0.5 part of dimethylcyclohexylamine and 0.5 part of lead octoate. The mixture forms a colourless fine-pored rigid foam.

EXAMPLE 16

A fine-pored rigid foam is prepared by mixing the following materials: 33.5 parts of heat-treated crude diphenylmethane diisocyanate, 6 parts of trichlorofluoromethane, 2 parts of butane-1,4-diol, 1.65 parts of a 33% solution of diazabicyclooctane in dipropylene glycol, 0.33 part of propylene oxide and 0.3 part of a siloxane-oxyalkylene copolymer.

EXAMPLE 17

A fine-pored rigid foam is prepared by mixing the following ingredients: 30 parts of a crude diisocyanatodiphenylmethane composition, 1 part of the diglycidyl ether of 2,2-bis(4-hydroxyphenyl) propane, 7 parts of trichlorofluoromethane, 1.5 parts of oxyethylated polypropylene glycol of molecular weight 1900 containing approximately 10% by weight of combined ethylene oxide, 2 parts of butane-1,4-diol, 0.5 part of dimethylcyclohexylamine and 0.25 part of lead octoate.

EXAMPLE 18

A solution of potassium 2-ethylhexoate in 1,4-butane diol is prepared by dissolving 29 parts of potassium hydroxide in 490 parts of diol, followed by neutralisation with 72 parts of 2-ethylhexoic acid. A fine-pored rigid foam is prepared by mixing 2.4 parts of the above solution with 30 parts of a crude diisocyanatodiphenylmethane composition, 7 parts of trichlorofluoromethane, 1.5 parts of oxyethylated polypropylene glycol (as in Example 17) and 0.3 part of tris-3-dimethylaminopropyl hexahydro-s triazine.

EXAMPLE 19

A foam is prepared by mixing the following ingredients: 30 parts of a crude tolylene diisocyanate composition containing 72% of tolylene diisocyanate, 11 parts of trichlorofluoromethane, 1 part of the diglycidyl ether of 2,2-bis(4-hydroxyphenyl)propane, 0.25 part of lead octoate, 0.5 part of dimethylcyclohexylamine, 0.7 part of a siloxane-oxyalkylene copolymer and a solution of 0.2 part of potassium acetate in 2 parts of butane-1,4-diol. The foam is rigid and fine-pored, but somewhat friable. The friability is considerably reduced by heating the foam for 4 hours at 100° C.

EXAMPLE 20

A rigid foam is prepared by mixing 30 parts of a crude diphenylmethane diisocyanate composition with 6 parts of trichlorofluoromethane, 2 parts of triethanolamine, 1 part of the diglycidyl ether of 2,2-bis(4-hydroxyphenyl) propane, 0.5 part of lead octoate, 0.5 part of dimethylbenzylamine and 0.3 part of a siloxane-oxyalkylene copolymer.

EXAMPLE 21

A rigid foam is prepared by mixing 30 parts of 1,1-bis(4-isocyanatophenyl)cyclohexane, 6 parts of trichlorofluoromethane, 2 parts of butane-1,4-diol, 0.25 part of lead octoate, 0.5 part of dimethylbenzylamine, 1 part of the diglycidyl ether of 2,2-bis(4-hydroxyphenyl) propane and 0.3 part of a siloxane-oxyalkylene copolymer.

EXAMPLE 22

0.7 part of potassium acetate is dissolved in 6.7 parts of butane-1,4-diol by warming and the solution is mixed with 1 part of dimethylcyclohexylamine, 10 parts of tris-β-chloroethyl phosphate, 2 parts of a siloxane-oxyalkylene copolymer and 0.2 part of water. 7 parts of the solution so obtained are mixed with 30 parts of a diisocyanatodiphenylmethane composition and 7 parts of trichlorofluoromethane to form a fine-pored low density rigid foam. The remainder of the solution is stored for 48 hours at room temperature. It remains clear, and when used to make a foam as above gives a foam of similar properties. By contrast, a mixture prepared from 6.7 parts of butane-1,4-diol, 0.5 part of lead octoate, 1 part of dimethylbenzylamine, 10 parts of tris-β-chloroethyl phosphate and 2 parts of a siloxane-oxyalkylene copolymer is only stable for a limited period after which precipitation of solid begins.

EXAMPLE 23

A mixture comprising 100 parts of crude diisocyanato diphenylmethane composition, 10 parts of trichlorofluoromethane and 2 parts of a siloxane-oxyalkylene copolymer is continuously blended with a mixture comprising 1 part of oxypropylated triethanolamine of hydroxyl value 530 mg. KOH/g., 6.7 parts of 1,4-butane diol, 0.1 part of triethanolamine, 0.5 part of lead octoate, 0.5 part of an alkyl phenol ethylene oxide condensate, 1 part of N,N-dimethylbenzylamine, 10 parts of tris-$\beta$-chloroethyl phosphate, 3 parts of the diglycidyl ether of 2,2-bis(4-hydroxyphenyl)propane and 1 part of a siloxane oxyalkylene copolymer. Sufficient of the blend is discharged into a mould, warmed to 40° C., with internal dimensions 22 inches x 16 inches x 3 inches to produce a foam having a density of 2.5 pounds per cubic foot. After completion of foaming the mould and contents are heated for 2 hours at 100° C. When tested according to British Standard 476: part 1: 1953, the foam is rated as Class 1.

I claim:
1. A process for the manufacture of rigid polymeric foams characterized by the presence therein of an isocyanurate ring structure, said process comprising forming a reaction mixture consisting essentially of, on a parts by weight basis, 100 parts of a simple organic polyisocyanate selected from the group consisting of monomeric organic polyisocyanates, mixtures thereof with polyisocyanates of a polymeric nature formed during the manufacture of said monomeric polyisocyanates, and preformed simple reaction products obtained by reacting an excess of said monomeric organic polyisocyanate with at least one monomeric polyol having a molecular weight up to about 134, from 0.5 to 5 parts of a catalyst for the polymerization of isocyanates, from 0 to 20 parts of an alcohol or phenol having a molecular weight not exceeding 300 and from 5 to 40 parts of a liquid of low boiling point which vaporizes under the influence of the exothermic reaction, the active hydrogen containing materials present in said reaction mixture being insufficient to react with more than 60% of the isocyanate groups initially present in said simple organic polyisocyanate, and allowing said mixture to react to form said rigid polymeric foam.

2. A process as claimed in claim 1 wherein the polyisocyanate is a crude diisocyanatodiarylmethane composition containing from 5 to 70% by weight of polyisocyanates of functionality greater than two, being the phosgenation product of a crude diaminodiarylmethane obtained by reacting an aromatic amine and formaldehyde in a molar ratio of between 4:1 and 1.2:1.

3. A process as claimed in claim 2 wherein the crude diisocyanatodiarylmethane composition is a crude diisocyanatodiphenylmethane composition.

4. A process as claimed in claim 1 wherein the reaction mixture contains from 0.1 to 2% of water based on the weight of polyisocyanate.

5. A process as claimed in claim 1 wherein the alcohol or phenol contains a plurality of hydroxyl groups in the molecule.

6. A process as claimed in claim 1 wherein the catalyst is an alkali metal salt of a carboxylic acid.

7. A process as claimed in claim 2 wherein said organic polyisocyanate has a viscosity of 50 to 5000 centipoises at 25° C.

8. A process as claimed in claim 7 wherein said organic polyisocyanate has a viscosity of 200 to 1000 centipoises at 25° C.

9. A process as claimed in claim 1 wherein said organic polyisocyanate has a viscosity up to 5000 centipoises at 25° C.

10. A process as claimed in claim 1 wherein said reaction mixture contains an effective amount of a surface active agent selected from the group consisting of siloxane-oxyalkylene copolymers, oxyethylated alkyl phenols, oxyethylated fatty alcohols and block copolymers of ethylene and propylene oxides.

11. A process as claimed in claim 1 wherein said reaction mixture contains a catalyst for the reaction between isocyanates and hydroxy compounds.

12. A process as claimed in claim 1 wherein said reaction mixture contains also a plasticizer.

13. A process as claimed in claim 1 wherein said reaction mixture contains a filler.

14. A process as claimed in claim 1 wherein said reaction mixture contains a flame retardant.

15. A process as set forth in claim 1 wherein said reaction mixture contains an antioxidant.

References Cited

UNITED STATES PATENTS

| | | |
|---|---|---|
| 2,978,449 | 11/1961 | France et al. |
| 2,993,870 | 7/1961 | Burkus. |
| 3,072,582 | 1/1963 | Frost. |
| 3,144,452 | 8/1964 | Wild et al. |
| 3,179,626 | 4/1965 | Beitchman. |
| 3,218,372 | 4/1966 | Bungl. |

FOREIGN PATENTS

| | | |
|---|---|---|
| 221,411 | 5/1959 | Australia. |
| 843,841 | 8/1960 | Great Britain. |

DONALD E. CZAJA, Primary Examiner

H. S. COCKERAM, Assistant Examiner

U.S. Cl. X.R.

260—30.6, 37, 45.7, 45.9, 45.95, 858, 859

UNITED STATES PATENT OFFICE
CERTIFICATE OF CORRECTION

Patent No. 3,516,950                              June 23, 1970

Geoffrey Arthur Haggis

It is certified that error appears in the above identified patent and that said Letters Patent are hereby corrected as shown below:

In the heading to the printed specification, line 9, "Apr. 15 1966" should read -- Apr. 29, 1965 --.

Signed and sealed this 23rd day of February 1971.

(SEAL)
Attest:

Edward M. Fletcher, Jr.                  WILLIAM E. SCHUYLER, JR.
Attesting Officer                          Commissioner of Patents